(12) United States Patent
Livshits et al.

(10) Patent No.: US 8,844,495 B2
(45) Date of Patent: Sep. 30, 2014

(54) ENGINE WITH INTEGRATED MIXING TECHNOLOGY

(75) Inventors: David Livshits, San Francisco, CA (US); Lester Teichner, Chicago, IL (US)

(73) Assignee: Tubulent Energy, LLC, Lexington, MA (US)

( * ) Notice: Subject to any disclaimer, the term of this patent is extended or adjusted under 35 U.S.C. 154(b) by 967 days.

(21) Appl. No.: 12/545,454

(22) Filed: Aug. 21, 2009

(65) Prior Publication Data

US 2011/0048353 A1 Mar. 3, 2011

(51) Int. Cl.
| | | |
|---|---|---|
| *F02M 25/00* | (2006.01) | |
| *F02M 23/00* | (2006.01) | |
| *F02M 29/06* | (2006.01) | |
| *F02B 43/10* | (2006.01) | |
| *F02M 31/08* | (2006.01) | |
| *F02M 25/07* | (2006.01) | |

(52) U.S. Cl.
CPC .............. *F02B 43/10* (2013.01); *Y02T 10/32* (2013.01); *Y02T 10/126* (2013.01); *F02M 29/06* (2013.01); *F02M 31/0825* (2013.01); *Y02T 10/121* (2013.01); *F02M 25/0722* (2013.01)
USPC ............ 123/250; 123/251; 123/1 A; 123/304; 239/432; 239/433; 239/584

(58) Field of Classification Search
CPC ... F02M 69/04; F02M 69/047; F02M 61/162; F02M 61/163; F02B 1/04; F02B 43/00; B01D 53/265
USPC ............. 123/536, 543–557, 537, 538, 539, 3, 123/567, 575, 25 A, 39, 1 R, 256, 250–251, 123/299, 301; 60/299
See application file for complete search history.

(56) References Cited

U.S. PATENT DOCUMENTS

| | | |
|---|---|---|
| 3,735,778 A | 5/1973 | Garnier |
| 3,980,233 A | 9/1976 | Simmons et al. |
| 4,215,081 A | 7/1980 | Brooks |
| 4,218,012 A | 8/1980 | Hamza et al. |

(Continued)

FOREIGN PATENT DOCUMENTS

| | | |
|---|---|---|
| DE | 3723618 | 12/1988 |
| DE | 4211031 | 10/1993 |

(Continued)

OTHER PUBLICATIONS

International Search Report for International Application No. PCT/US2008/75366, Nov. 13, 2008, 2 pp.

(Continued)

*Primary Examiner* — Lindsay Low
*Assistant Examiner* — Kevin Lathers
(74) *Attorney, Agent, or Firm* — Vedder Price PC (57) ABSTRACT

The present disclosure generally relates to an engine with an integrated mixing of fluids device and associated technology for improvement of the efficiency of the engine, and more specifically to an engine equipped with a fuel mixing device for improvement of the overall properties by inline oxygenation of the liquid, a change in property of the liquid such as cooling form improved combustion, or the use of re-circulation of exhaust from the engine to further improve engine efficiency and reduce unwanted emissions.

22 Claims, 11 Drawing Sheets

(56) References Cited

U.S. PATENT DOCUMENTS

| | | |
|---|---|---|
| 4,398,827 A | 8/1983 | Dietrich |
| 4,415,275 A | 11/1983 | Dietrich |
| 4,464,314 A | 8/1984 | Surovikin et al. |
| 4,553,504 A | 11/1985 | Duggal et al. |
| 4,812,049 A | 3/1989 | McCall |
| 4,917,152 A | 4/1990 | Decker |
| 4,954,147 A | 9/1990 | Galgon |
| 5,174,247 A | 12/1992 | Tosa et al. |
| 5,176,448 A | 1/1993 | King et al. |
| 5,183,335 A | 2/1993 | Lang et al. |
| 5,193,341 A * | 3/1993 | Sibbertsen et al. ............ 60/299 |
| 5,330,105 A | 7/1994 | Kaylor |
| 5,360,166 A * | 11/1994 | Nogi et al. .................... 239/404 |
| 5,449,114 A | 9/1995 | Wells et al. |
| 5,452,955 A | 9/1995 | Lundstrom |
| 5,460,449 A | 10/1995 | Kent et al. |
| 5,492,404 A | 2/1996 | Smith |
| 5,492,409 A | 2/1996 | Karlsson et al. |
| 5,575,561 A | 11/1996 | Rohwer |
| 5,617,997 A * | 4/1997 | Kobayashi et al. ............... 239/8 |
| 5,657,631 A | 8/1997 | Androsov |
| 5,678,766 A | 10/1997 | Peck et al. |
| 5,820,256 A | 10/1998 | Morrison |
| 5,865,158 A | 2/1999 | Cleveland et al. |
| 5,918,465 A | 7/1999 | Schmid |
| 5,992,529 A | 11/1999 | Williams |
| 6,022,135 A | 2/2000 | Williams |
| 6,027,241 A | 2/2000 | King |
| 6,036,356 A | 3/2000 | Yang et al. |
| RE36,969 E | 11/2000 | Streiff et al. |
| 6,170,978 B1 | 1/2001 | Short |
| 6,205,983 B1 * | 3/2001 | Egizi ............................ 123/531 |
| 6,315,217 B1 * | 11/2001 | Park ............................ 239/135 |
| 6,367,262 B1 | 4/2002 | Mongia et al. |
| 6,422,735 B1 | 7/2002 | Lang |
| 6,432,148 B1 | 8/2002 | Ganan-Calvo |
| 6,534,023 B1 | 3/2003 | Liou |
| 6,564,770 B1 * | 5/2003 | Cathcart ..................... 123/299 |
| 6,669,843 B2 | 12/2003 | Arnaud |
| 6,817,347 B2 * | 11/2004 | Noble .......................... 123/536 |
| 6,986,832 B2 | 1/2006 | Lamminen et al. |
| 7,018,435 B1 | 3/2006 | Wentinck |
| 7,041,144 B2 | 5/2006 | Kozyuk |
| 7,069,901 B2 * | 7/2006 | Shiraishi et al. ............. 123/261 |
| 7,165,881 B2 | 1/2007 | Holl |
| 7,448,794 B2 | 11/2008 | Hansen |
| 7,703,446 B2 * | 4/2010 | Bromberg et al. ............ 123/575 |
| 7,743,754 B2 * | 6/2010 | Cheiky ......................... 123/549 |
| 2007/0137590 A1 * | 6/2007 | Vetrovec ..................... 123/25 A |
| 2007/0206435 A1 | 9/2007 | Lester et al. |
| 2008/0016968 A1 | 1/2008 | McCall et al. |
| 2008/0156303 A1 * | 7/2008 | Bromberg et al. ............ 123/575 |
| 2008/0194868 A1 | 8/2008 | Kozyuk |

FOREIGN PATENT DOCUMENTS

| | | | |
|---|---|---|---|
| DE | 29612769 | 12/1996 | |
| DE | 10310442 | 9/2004 | |
| EP | 0044498 | 1/1982 | |
| FR | 2872866 A1 * | 1/2006 | ............ F02M 69/04 |
| GB | 2263649 | 8/1993 | |
| GB | 2334901 | 9/1999 | |
| JP | 56130213 | 10/1981 | |
| JP | 62079835 | 4/1987 | |
| JP | 51161899 | 6/1993 | |
| JP | 8131800 | 5/1996 | |
| JP | 2001000849 | 1/2001 | |
| JP | 2006326498 | 12/2006 | |
| KR | 20040040926 | 5/2004 | |
| RU | 2133829 | 7/1999 | |
| SU | 1662653 | 7/1991 | |
| WO | WO88/06493 | 9/1988 | |
| WO | WO93/07960 | 4/1993 | |
| WO | WO00/12202 | 3/2000 | |
| WO | WO2006/038810 | 4/2006 | |
| WO | WO2006/117435 | 11/2006 | |
| WO | WO2007/086897 | 8/2007 | |
| WO | WO2007/115810 | 10/2007 | |
| WO | WO2009/021148 | 2/2009 | |
| WO | WO2009/035334 | 3/2009 | |

OTHER PUBLICATIONS

Written Opinion for International Application No. PCT/US2008/75366, Nov. 13, 2008, 5 pp.

International Search Report for International Application No. PCT/US2008/75374, Mar. 23, 2008, 4 pp.

Written Opinion for International Application No. PCT/US2008/75374, Mar. 23, 2008, 8 pp.

* cited by examiner

ENGINE WITH INTEGRATED MIXING TECHNOLOGY

FIELD OF THE DISCLOSURE

The present disclosure generally relates to an engine with an integrated mixing of fluids device and associated technology for improvement of the efficiency of the engine, and more specifically to an engine equipped with a fuel mixing device for improvement of the overall properties by inline oxygenation of the liquid, a change in property of the liquid such as cooling form improved combustion, or the use of re-circulation of exhaust from the engine to further improve engine efficiency and reduce unwanted emissions.

BACKGROUND

Diesel engines have different operating conditions than spark-ignition engines. They rely on different thermodynamic principles and different fuel cycles. Power is mostly controlled by a regulation of the fuel supply directly, not by the control of the air supply. When diesel engines run at low power, the mixture and combustion is not deprived of oxygen and few by products are created, but when load or effort (W) is added to these engines, a greater amount of carbon monoxides and impurities are produced.

In these systems, the fuel mixture is starved for oxygen to levels as low as 5% of the needed stoichiometric mixture or having a equivalence ratio of 20 to 1. The equivalence ratio ($\Phi$) being defined as $\Phi=1/$(oxygen levels/stoichiometric mixture oxygen levels) and where $\Phi=20$ for a fuel starved at 5% of needed oxygen. The term stoichiometry is a calculation of a quantitative relationship of the reactants and the products in a balanced chemical reaction. If the oxygen level is at a stoichiometric mixture level, or a mixture where the equivalence ratio is 1, all of the given products and reactants are used by the chemical reaction. What is desired is a equivalence ratio as close to 1 as possible. Air fuel ratios of common fuels, include 14.7:1 for gasoline, 17.2:1 for natural gas, and 14.6:1 for diesel fuel. In mass these ratios correspond to 6.8%, 7.9%, and 6.8% respectively.

While oil refineries may help with removing sulfur and lead from the fuel and ultimately reduce associated emissions, systems forced to operate at fuel staved regimes must develop other processes to reduce soot emissions, fine particles, and nanoparticles found in the exhaust gasses of these engines while increasing their overall thermal efficiency of the engine. For example ceramic soot filters or other after burning system can be used in an effort to decrease unwanted emissions. What is needed is a system that may be inserted within the existing system and not external to the system to reduce soot emissions, and increase thermal efficiency of the engine.

While this invention is directed to any thermodynamic combustion cycle and related combustion device, and any device or engine, this disclosure describes mainly a current best mode directed at the diesel cycle for diesel combustion engines as invented by Rudolph Diesel in 1897. The concepts described here, when applicable are also used in other combustion cycles and other thermodynamic based devices.

The ideal diesel cycle is a four phase loop generally illustrated by a Pressure (P) v. Specific volume (V) diagram. In a first phase of the process, a compression is made at an isentropic regime, consequently the specific volume is decreased from $V_1$ to $V_2$ as the pressure is increased from $P_1$ to $P_2$. (Where the subscript is the number of the position of on the four step cycle). Work is done $W_{in}$ in this phase for example by a piston compressing a working fluid such as air. In the second phase of reversible constant pressure heating, heat $Q_{in}$ is added via the combustion of the fuel at constant pressure $P_2$. The specific volume V increases a small fraction from $V_2$ to $V_3$ during this second phase. In a third phase of the process known as the isentropic expansion phase, work is released $W_{out}$ by the working fluid expanding on the piston creating a torque at a cam. During this phase, the pressure drops from $P_2$ to $P_4$ and the specific volume is increased to its maximum from $V_3$ back to $V_1$. Finally, in the fourth and last phase, the system is returned to the starting point in a reversible constant volume cooling by taking out heat $Q_{out}$ by venting the air out of the piston from a pressure $P_4$ to the initial pressure $P_1$, thus returning the system to the $P_1$, $V_1$ configuration.

Thermal efficiency ($\eta_{th}$) of the diesel fuel cycle is dependant upon several parameters including a compression ratio (r) and a cut-off ratio ($\alpha$). The cut-off ratio ($\alpha$) is defined as a ratio between the end and start volumes of the combustion phase $\alpha=V_3/V_2$, and the compression ratio (r) is defined as $r=V_1/V_2$. Finally, a ratio of specific heats ($\gamma$) is used as part of the thermal efficiency calculation and is defined as $\gamma=C_P/C_V$. The ideal thermal efficiency for a diesel cycle is given as:

$$\eta_{TH} = 1 - \frac{1}{r^{\gamma-1}}\left(\frac{\alpha^\gamma - 1}{\gamma(\alpha - 1)}\right)$$

Thermal efficiency can also be calculated using temperatures instead of volumes since $V_3/V_2=T_3/T_2$ where $T_3$ is the temperature of the fluid at the end of the third phase of the cycle and $T_2$ is the temperature of the fluid at the end of the second phase of the cycle. What is desired is an effective cycle operating as close to thermal efficiency of 1 as possible (i.e. where the factor in the equation drops to 0).

Further, since hydrocarbons (HC) are released as part of the exhaust gasses, the thermal efficiency is lowered by this unburnt fuel released to the atmosphere in the overall cycle since a portion of the fuel is not used. Further, exhaust gas is emitted as a result of the combustion of fuels such as natural gas, gasoline, petrol, diesel, fuel oil, coal, etc. A large proportion of exhaust gas is discharged into the atmosphere through exhaust pipes, gas stacks, or propelling nozzles. Exhaust gasses are made mostly of harmless nitrogen ($N_2$), water vapor ($H_2O$), and carbon dioxide ($CO_2$), along with a small part of undesirable noxious or toxic substances, such as carbon monoxide (CO), hydrocarbons (HC), nitrogen oxides ($NO_x$), other partly unburnt fuel, and particulate matter (soot). Exhaust gasses of diesel engines may also contain a complex and harmful cocktail of impurities. For example, these gasses also include lead (Pb), or even sulfuric dioxides (SOj).

Exhaust fumes are used and recycled in an effort to limit knocking or lowering of the combustion point temperature in the cylinder. Further, exhaust gas reintroduced as fuel recycle unburnt HC particles and reduces the overall emission of unburnt particles associated with a oxygen deprived starvation combustion process. What is needed is a way system of introduction of oxygen into a oxygen deprived, rich mixture fuel cycle engine that improves thermal efficiency, lowers unwanted emissions, and soot particles without adversely affecting the engine performances.

SUMMARY

The present disclosure generally relates to an engine with an integrated mixing of fluids device and associated technology for improvement of the efficiency of the engine, and more specifically to an engine equipped with a fuel mixing device for improvement of the overall properties by inline oxygenation of the liquid, a change in property of the liquid such as cooling form improved combustion, or the use of re-circulation of exhaust from the engine to further improve engine efficiency and reduce unwanted emissions.

The placement of a fuel mixing device within systems of combustion engines, and more specifically between a fuel supply and a nozzle of a combustion chamber allows for the oxygenation of the fuel by creating a gaseous fuel composite where small bubbles of pressurized air are found. Once this gaseous fuel composite is expanded adiabatically into the combustion chamber, a useful cooling effect may be used to lower combustion point temperature for the fuel mixture, other cooling systems can be inserted into the device to provide additional cooling, other fuels or fluids can also be mixed into the gaseous fuel composite for improved properties, reduced impurities and soot, and allow for the recycling of oxygen deprived exhaust gasses without adverse effects to the performances of the engine.

BRIEF DESCRIPTION OF THE DRAWINGS

Certain embodiments are shown in the drawings. However, it is understood that the present disclosure is not limited to the arrangements and instrumentality shown in the attached drawings.

FIGS. 14-16 are three different versions of the mixing device for producing a gaseous fuel composite mixture, where

DETAILED DESCRIPTION OF THE INVENTION

For the purposes of promoting and understanding the principles disclosed herein, reference is now made to the preferred embodiments illustrated in the drawings, and specific language is used to describe the same. It is nevertheless understood that no limitation of the scope of the invention is hereby intended. Such alterations and further modifications in the illustrated devices and such further applications of the principles disclosed and illustrated herein are contemplated as would normally occur to one skilled in the art to which this disclosure relates.

Figure 1:
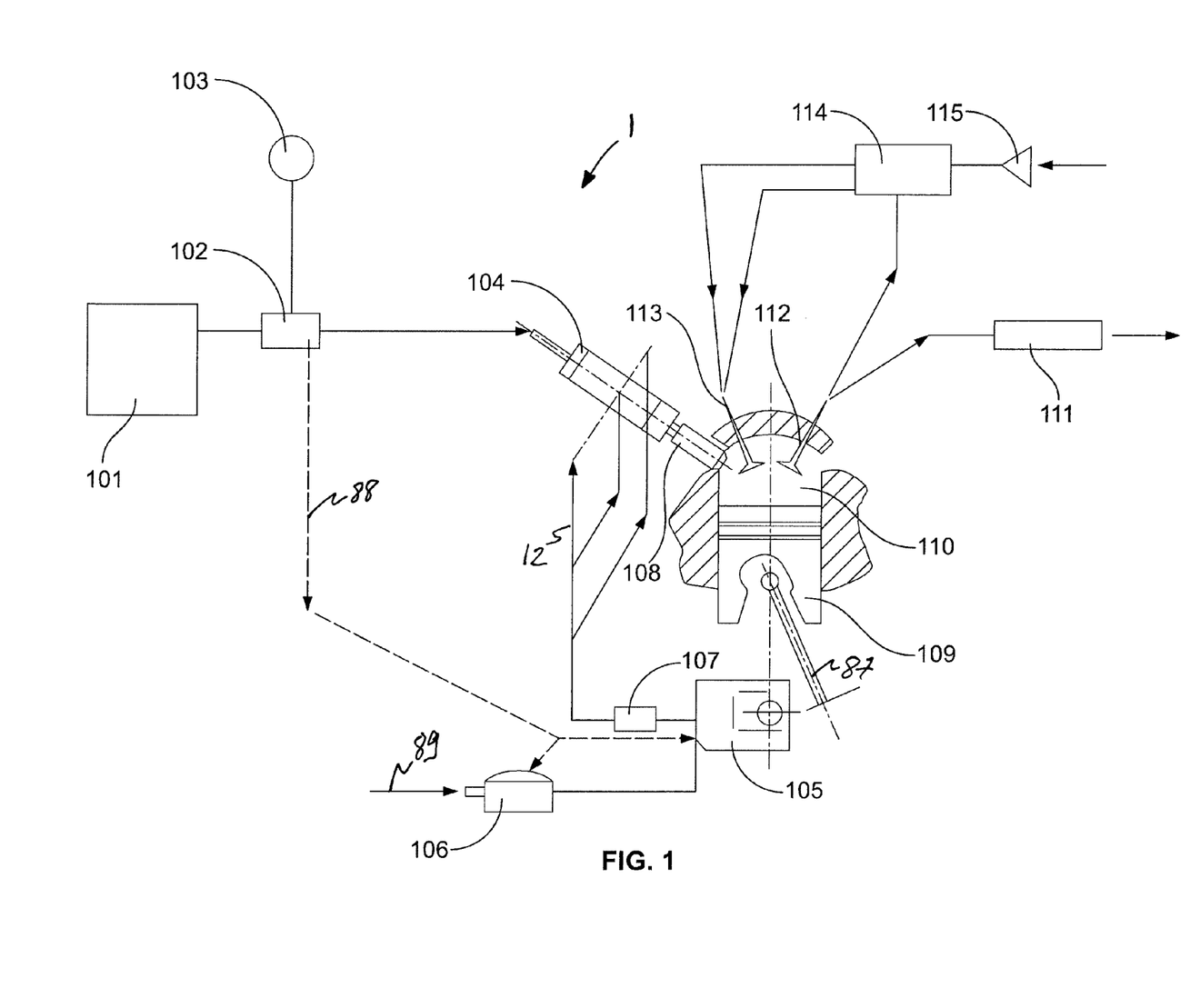
FIG. 1 is an integrated system with a mixing device as part of a combustion cycle for production of an oxygenated gaseous fuel composite according to an embodiment of the present disclosure.

FIG. 1 shows an internal combustion engine 1 with a supply of a fuel 101 with a pump 102 connected to a cylinder 109 with a combustion chamber 110 in communication with a nozzle 108, an input valve 113 in the combustion chamber 110 for entry of air shown by the arrow on the upper right of the figure, a release valve 112 for the release of exhaust gasses as shown by the arrow formed in the combustion chamber 110, and a mixing device 104 connected to the pump 102 and the nozzle 108 for producing a gaseous fuel mixture released through the nozzle 108 into the combustion chamber 110.

In one embodiment, air as part of a diesel engine is used in a cylinder of a cylinder 109 and is compressed in a ratio of approximately 17 times the original volume. In another embodiment, the compression ratio is 14:1 to 24:1. Fuel, when injected into the cylinder may be injected using an atomizer such as the nozzle 108 to spray fine particles at regular intervals before it is mixed with compressed air coming in from the input valve 113 for the creation of a self-combustible mix. At high regime, rich mixtures are used in the diesel engine and the burning of the fuel is a conditions where oxygen is missing from the reaction thus creating unwanted soot and particles. Mixing air into fuel and creating a gaseous fuel mixture allows for a release of carburant into the combustion chamber 110 with a portion of reactant already in place. If the air mixed into the fuel is pressurized, upon entry into the combustion chamber 110, the gaseous fuel mixture expands quickly to fill the combustion chamber 110 and mix with any import air via the input valve 113. Oxygen needed for a rich mixture is added reducing the combustion point in the combustion chamber 110 and thus improving the efficiency of the reaction and reducing the unwanted gasses produced along with any particles such as soot produced and left in the exhaust gas.

In another alternate embodiment, oxygenation of the fuel via the formation of a gaseous fuel mixture allows for the recirculation of a portion of oxygen deprived exhaust gasses into the fuel mixture that would otherwise have adverse effects. The current disclosure is directed at a device within a thermodynamic cycle into a mixing device, and more specifically merged into the diesel fuel to create a gaseous fuel composite mix or a fuel mixture for injection into a combustion chamber such as a piston in a diesel engine. Exhaust gasses may be mixed in with fuel via a gas/liquid mixing device or a gas/liquid mixing device. Pressurized air or a cooling ring may also be used to cool the temperature at the combustion chamber 110 and improve the reaction.

Because time needed to homogenously mix liquid fuel with compressed air at a nozzle entry into a piston or any other combustion chamber, non homogenous mixed areas in a cylinder may result in partial combustion, loss of energy, loss of specific capacity or thermal efficiency. Uneven mixing also creates an increased volume of exhaust gas and a greater concentration of toxic substances in exhaust. By mixing in air, or other reactant in fuel, and more specifically compressed air, the effective contact surface between the fuel and reactant upstream from the combustion chamber, the mixture can expand in a combustion chamber to help vaporize the fuel before combustion, and increases process times by merging compressed gas up to a stoichiometric quantity within the fuel upstream from the combustion chamber or in the case of an engine in the cylinder. In one embodiment, fuel expanding from a compressed fuel mixture disperses fuel particles in a matrix of size of 2 microns.

Figure 5:
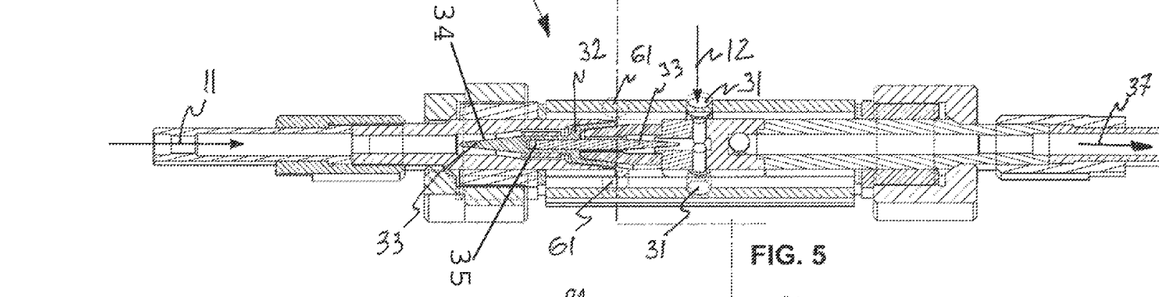
FIG. 5 is a mixing device for producing the gaseous fuel composite according to an embodiment of the present disclosure.

In a mixing device 104 as shown at FIG. 5, fuel such as diesel fuel 11 enters as shown by the arrow by what is illustrated as the left side. In a subsequent stage air 12 enters into the mixing device 10 by a lateral opening 31. Several openings 61 are shown on the device for the entry of several inlet of air, several inlets of other gasses, exhaust gas, or other fluids such as other fuels. The air 12 and fuel 11 then travel in opposite direction to merge at the heart 32 of the mixing device 104. The dynamic mixing is described in International Application No. PCT/US08/75374, filed on Sep. 5, 2008, entitled Dynamic Mixing of Fluids, and International Application No. PCT/US08/75366, filed also on Sep. 5, 2008 entitled Method for Dynamic Mixing of Fluids both application fully incorporated herein by reference.

Figure 4:
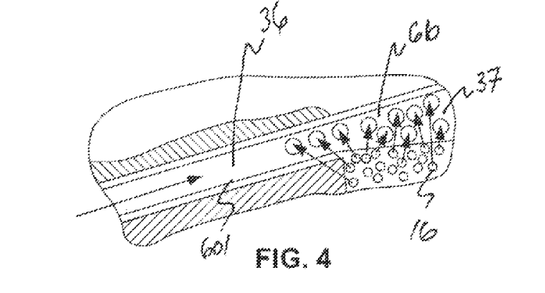
FIG. 4 is a close-up view from FIG. 5 of the gaseous transfer and the formation of the oxygenated gaseous fuel composite in the mixing device according to an embodiment of the present disclosure.
Figure 6:
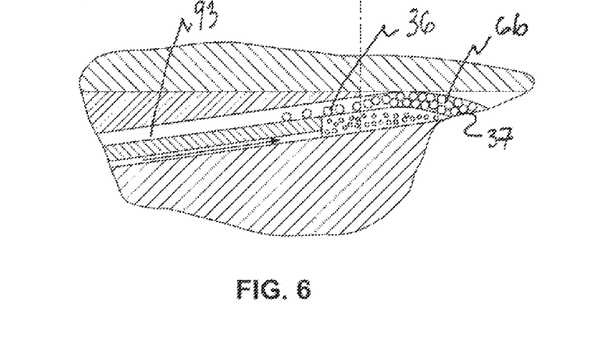
FIG. 6 is a close-up view from FIG. 5 of the distribution of gaseous elements within the fluid during the formation of the oxygenated gaseous fuel composite in the mixing device of FIG. 5 according to an embodiment of the present disclosure.
Figure 7:
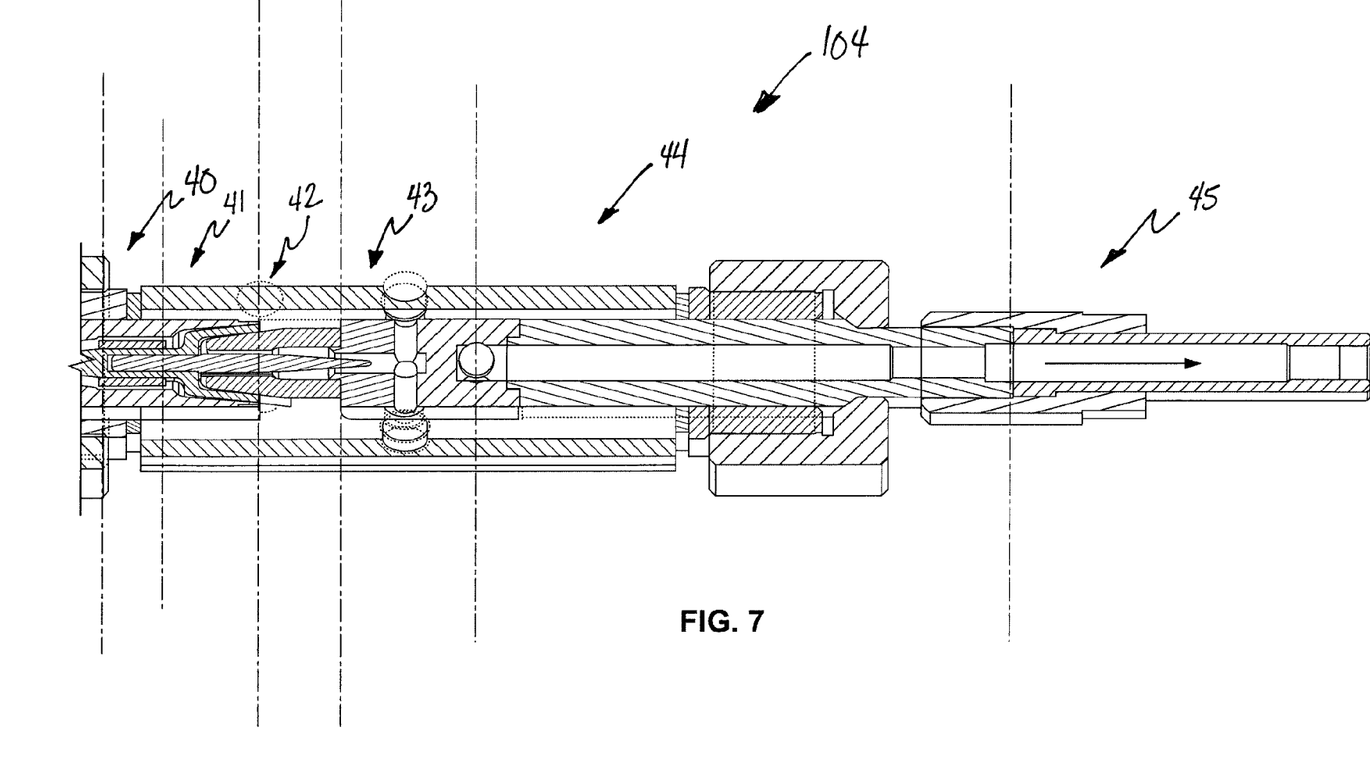
FIG. 7 is an illustration of the different stages of production of the gaseous fluid composite within the mixing device.
Figures 8, 9:
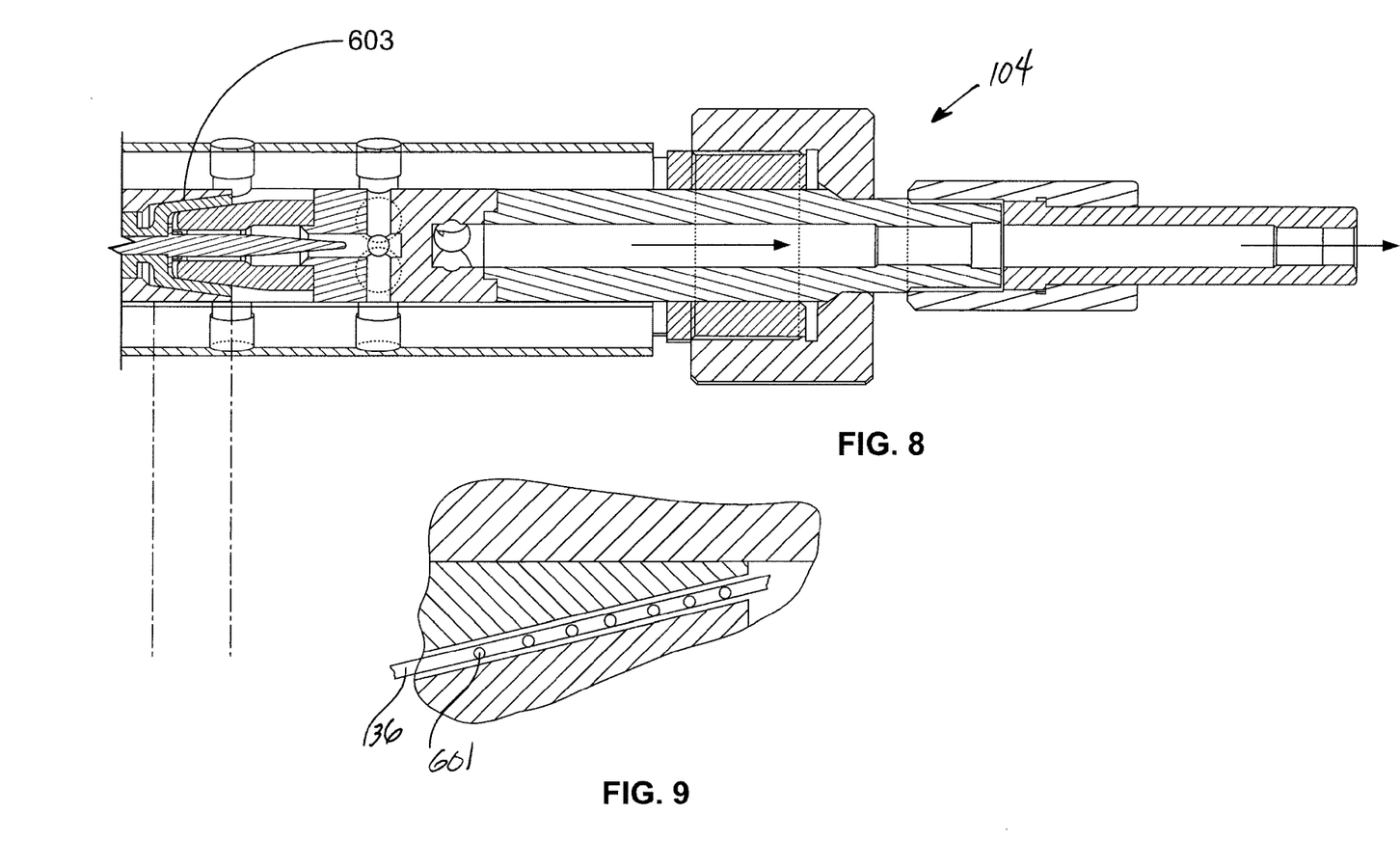
FIG. 8 is an illustration shows the different portions of the mixing device used for the creation of modified pressure in the fuel as precursory steps to the formation of the gaseous fluid composite.
FIG. 9 is a close-up view of the location of zones of modified pressure in the fuel within the device shown at FIG. 8.
Figures 10, 11:
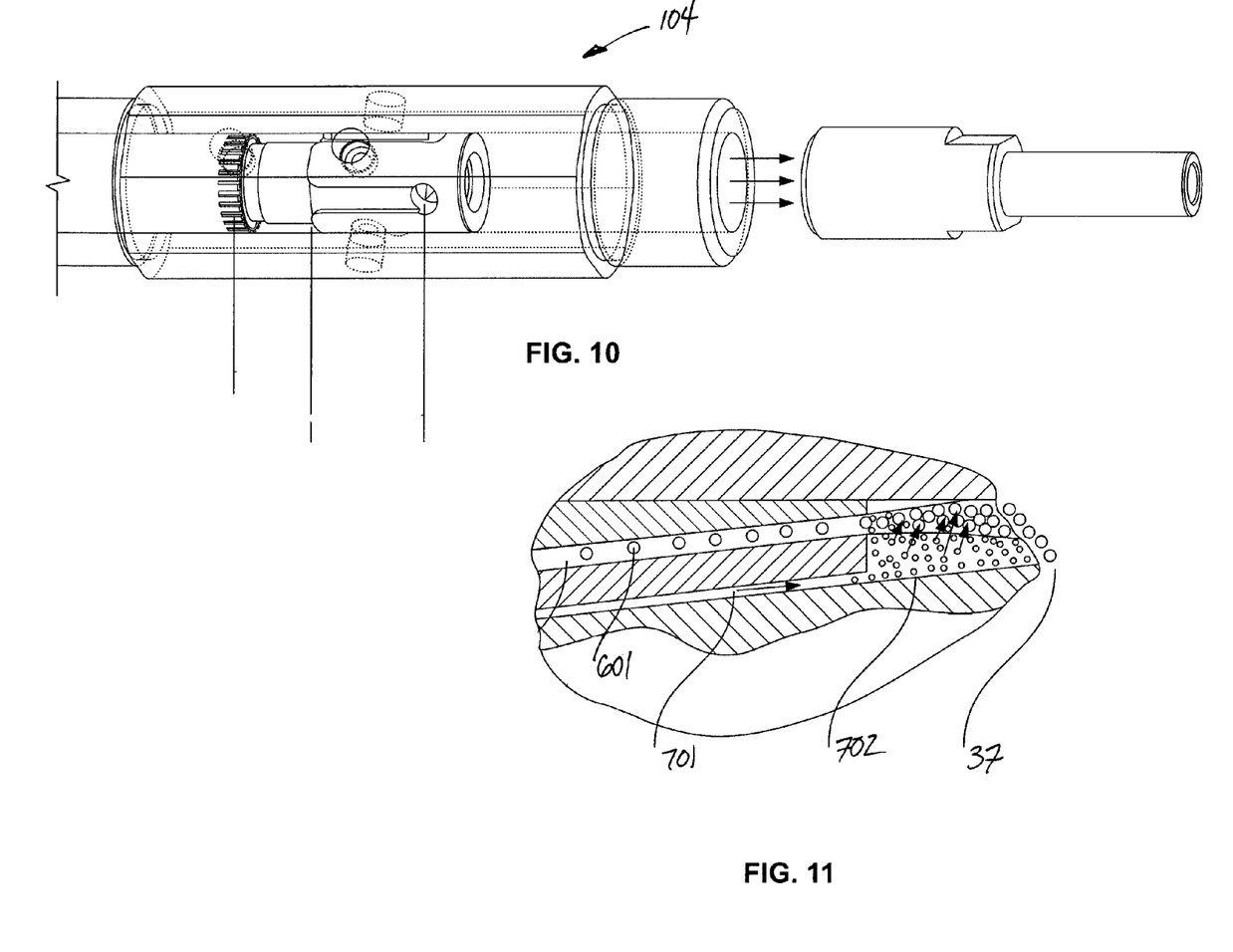
FIG. 10 is an illustration of the structure for creation of a broken down fluid stream in the mixing device.
FIG. 11 is a close-up view of the dynamic formation of the gaseous fuel mixture within the mixing device.

Both fluids are then broken down at a first cone 33 in a plurality of streams 34 and then travel on opposite sides of a conical reflector 35 until it enters a third stage area of encapsulation 36. This area of encapsulation is shown with greater detail at FIGS. 4 and 6. Depending on the ratios of air to fuel, a foam-like mixture can be created and the gaseous fuel mixture 37 as shown by the arrow on the right of FIG. 5 into a four stage area of injection. FIG. 7 shows the different stages of the device 104 from left to right a first stage of diesel fuel homogenizer 40, a second stage of diesel fuel homogenizer 41, a quasi-boiling area for precursory steps 42, a composite collection area 43, an pressurization area of the composite fuel mixture 44, and finally a composite output area 45.

Returning to FIG. 1, the diagram illustrates a system where a tank 101 of fuel such as diesel fuel introduces a liquid fuel into the system and includes different control element of generally used by such systems. A fuel pump 102 is connected to the tank 101 and transfers and pressurizes the fuel into the system via a transfer line. A monitoring system 103 is used to monitor the pressure and load at the pump 102 to regulate the system. Fuel is then sent via the non dashed lined to the mixing device for the preparation of a gaseous fuel composite or a fuel mixture 104 as shown on FIG. 4 as 10. The device 104 is then connected as a nozzle or an atomizer 108 for injection of a gaseous fuel composite into the chamber of combustion of the cylinder of the diesel engine 110.

The system further includes a compressor 105 attached or in relationship with the shaft of the engine 87 where the compressor 105 or the filter 106 along can be greased by an import of diesel fuel as shown by the dashed line 88. the diesel fuel. A system 107 to control the charge, flow and pressure of air in relation to a needed demand at the fuel mixture is used to transfer part of air coming from an air filter 106 taking air as shown by the arrow from the atmosphere 89. This air filter 106 includes all baths and mesh designed to purify and control the relative humidity of a fraction of water vapor entering the system.

Figure 14:
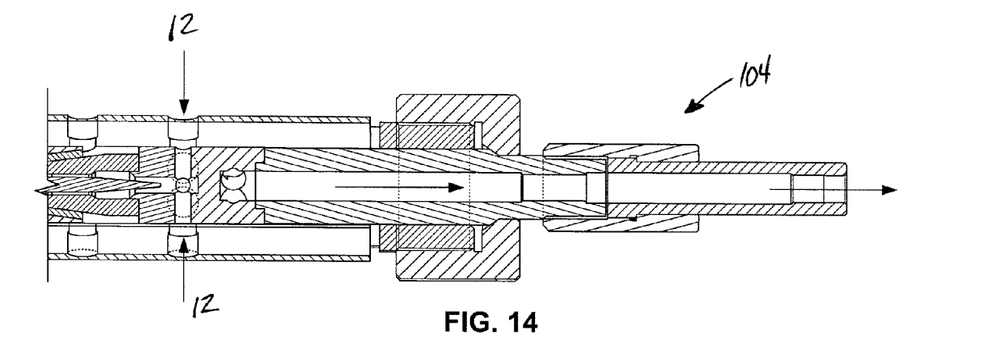
FIG. 14 is an oxygenated gaseous fuel composite with air.

The system as shown on FIG. 1 further describes the device as shown on FIG. 14 where only air 12 is used as entry for the mixing of fluids. The engine includes a piston 109, a chamber of combustion 110, an exhaust pipe 111 connected to release valves 112 for the exhaust gasses. As drawn, part of the exhaust gas is cycled to a system for accelerated pressurization 114 with a upstream air filter for the second input of air shown by the arrow and a return of air to the valve 113 for input of air into the combustion chamber 110. FIG. 1 corresponds to a system for a first configuration.

Figure 2:
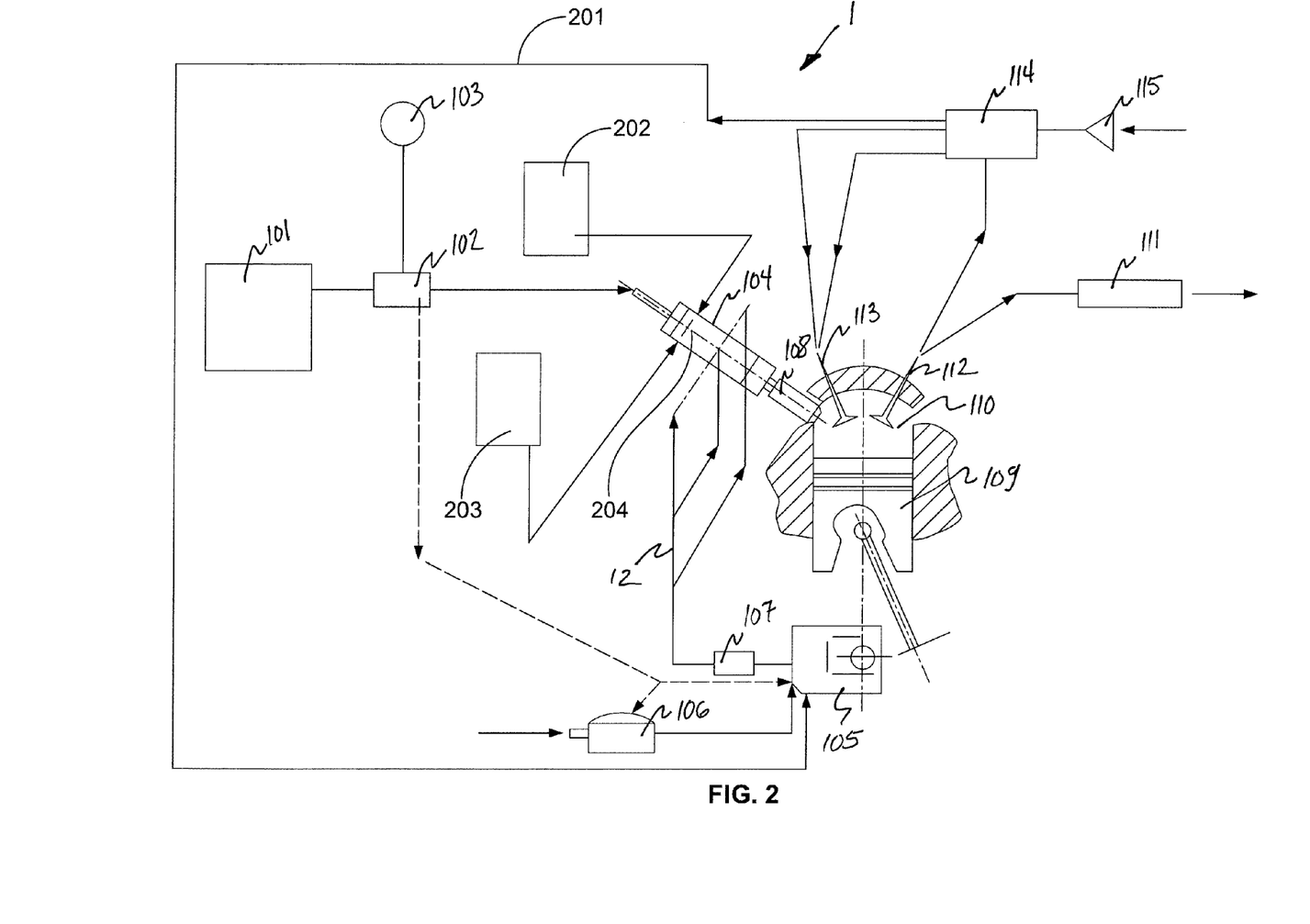
FIG. 2 is a diagram of the integrated system of FIG. 1 where a second fluid may be mixed into the oxygenated gaseous fuel composite such as water, ethanol, or exhaust gas according to another embodiment of the present disclosure.

The system as shown on FIG. 2 is somewhat similar but with some changes. A secondary reservoir or tank such as a tank of water 202 or a tank of ethanol fuel 203 or any other fluid or liquid including other fuel can be used to mix into the incoming fuel from tank 101. The system and mixing device 104 as shown can mix several fluids before a phase of merger with a gas. While no control or flow regulation pumps are shown in conjunction with the tanks 202, 203, what is contemplated is a control mechanism for the injection of a secondary fluid such as water 202 or a secondary fuel such as ethanol 203 into the device 104. FIG. 5 shows for example inlets 61 for either the water 202 or the secondary fuel or fluid 203 can be added. The use of a plurality of input fluids is well described in International Application No. PCT/US08/75374, filed on Sep. 5, 2008, entitled Dynamic Mixing of Fluids, and International Application No. PCT/US08/75366, filed also on Sep. 5, 2008 entitled Method for Dynamic Mixing of Fluids incorporated herein fully by reference.

Figure 15:
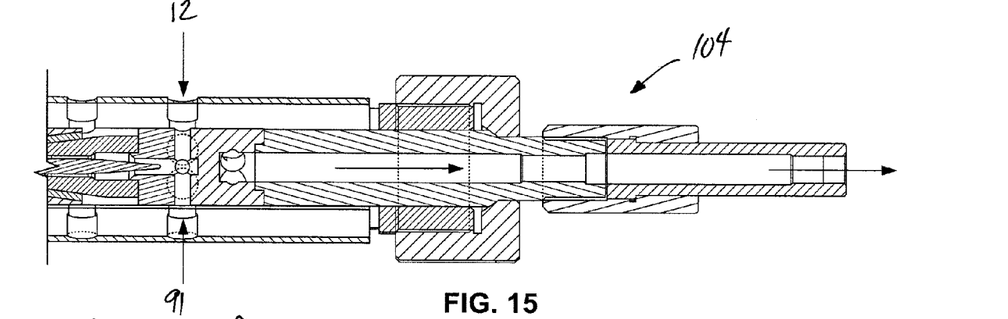
FIG. 15 is an oxygenated fuel composite with air and include a portion of recycled exhaust gas.

As shown in FIG. 2, a portion of the exhaust gas passing from the valve 112 into the system 114 is then sent via line 201 to the compressor for distribution as part of the entry air into the device 104 as shown on FIG. 15. FIG. 2 does not shown different lines capable of splitting exhaust air and air to different nozzles of the device 104 but what is contemplated is either a system where exhaust air is mixed with incoming fresh air at the compressor 105 or a dual chamber system capable of directing to the device 104 both a controlled flow of fresh air and a controlled flow of exhaust gas as shown on FIG. 15.

Figure 3:
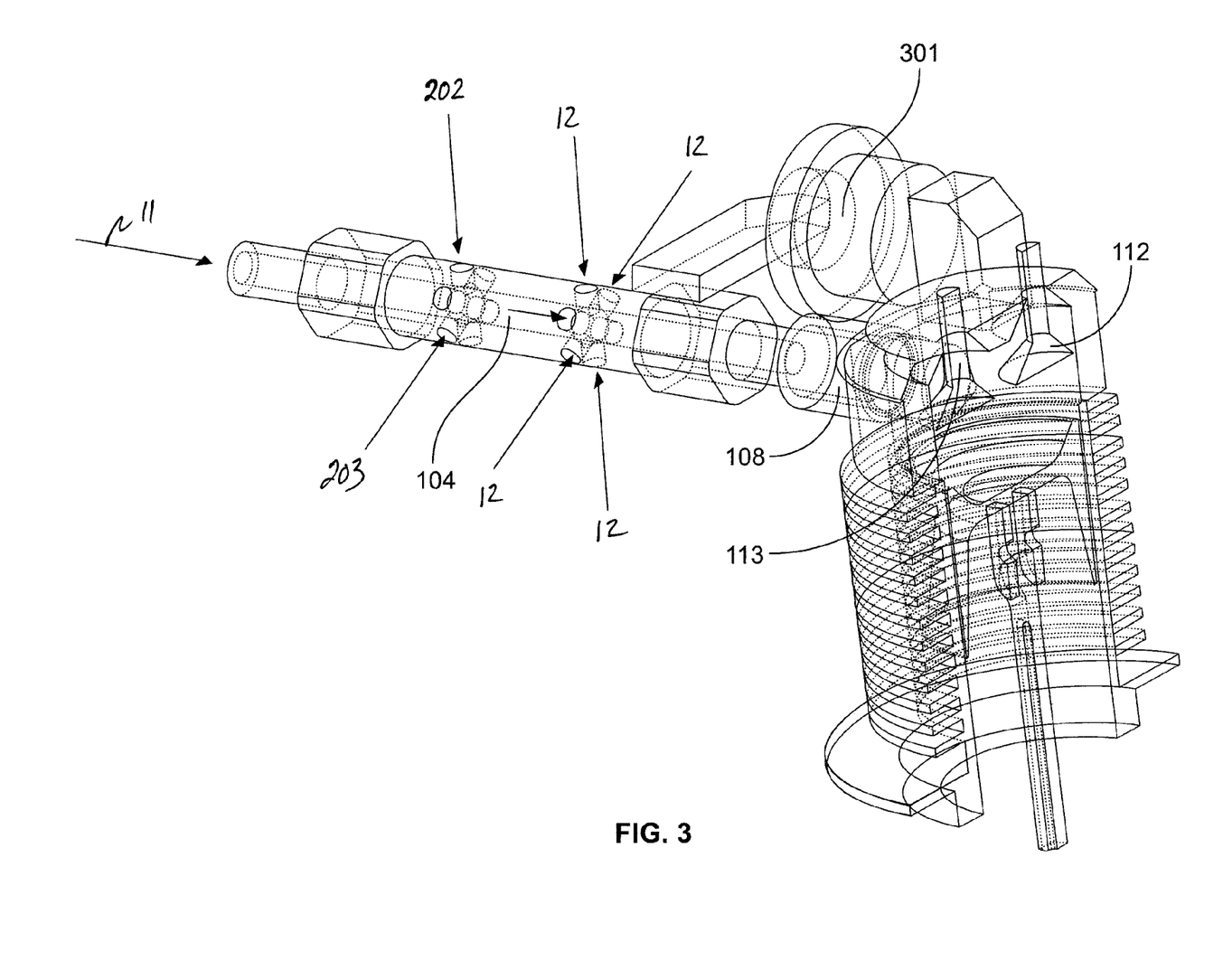
FIG. 3 is a close up view of the mixing device for the production of the gaseous fuel composite as placed on a cylinder of an engine and adjacent to adjacent systems according to an embodiment of the present disclosure.

FIG. 3 shows for example the configuration as described in FIG. 2 where water 202, ethanol 203 or any other fluid is mixed in with the diesel fuel 11 to create a fuel mixture and is then transformed into a gaseous fuel composite when air 12 (as shown) or exhaust gas (not shown) is added at the subsequent step along the device 104. FIG. 3 further shows a second step device 301 such as a booster or other device used to alter the system by altering or further compressing the incoming gaseous fuel composite, speeding the gaseous fuel composite, heating the gaseous fuel composite, etc.

At the first stage, standard fuels 11 such as diesel, gasoline, bio-fuels, etc. enter the device under normal fuel pump pressures. Once divided into small streams or approximately 100 microns 93 in an embodiment, the geometry directs the streams into an area for mixing 66. At FIG. 4, the fluid flow 13 travels until it reaches an area where pressures fall below vapor pressure 601, 602 and the liquid is in forced inertial transient shock waves not unlike localized cavitation (i.e. where small vapor bubbles desire to form within the liquid). Since liquid is incompressible it cannot expand until it reaches the air flow area for mixing 66 and enters in contact with air bubbles 16. The waves effect collapses air structures such as air bubbles in contact with the liquid.

At the stage of entry of air into the mixing device 104, the flow is controlled by a compressor. In one embodiment, air channels of approximately 25 microns are found but the size and orientation of these channels may vary. Air flow and fuel flow 11 are regulated to create composite mixtures of ratios of 20 to less than 1. At the encapsulation stage, a double Bernoulli effect creates Joule-Thompson conditions and produces an internal vacuum in the chamber forcing cavitation and quasi-boiling. At the fourth stage, the mixture is injected into a chamber and transforms into a gas-like material. This gas-like material when pressurized is then added to the combustion chamber 110 where free of the nozzle 108 it expands prior to ignition. This adiabatic expansion is a primary cooling effect. In one embodiment, the cooling effect can reach up to 79 deg. Celsius for a fuel entered at 28 deg. Celsius and air entered at 50 deg. Celsius.

In one embodiment, the diesel fuel pump 102 as shown on FIG. 1 is a standard fuel pump and operates at a pressure of 45 psi. The mixing device 104 shown on FIG. 1 in one embodiment creates a fuel/air mixture with the characteristic of a gas much like propane where small fuel particles are surrounded by a mixture of compressed air. In one embodiment, the density of diesel fuel propane mix is 1.87 kg/m3 or 1.87 g/L. Density of the diesel fuel if taken at 0.86 kg/L or 8,600 g/L is 4,600 times greater than the created diesel fuel propane mix. For the density to be reduced by 4,600 times, a great quantity of air must be introduced into the mix.

In one embodiment, an air compressor 105 of 1.2 kw capable of pushing 3.3 l/s of air at 10 bars is used to allow for the creation of a propane like mixture 11 for a diesel fuel flow of 10 gal/hour. In another embodiment, air to be added into the mixing device 104 is taken to be approximately 10% of the stoichiometric requirements for air into the combustion chamber, the 90% remaining may be added into ordinary combustion media such as entry valves 113. The fraction of water in the compressed air or the exhaust gas can be calculated from humidity ratio, temperature of the gas, and the volume of air entered into the process. In one embodiment, 32.8 liters of air may contain approximately 6.5 g of water.

Figure 12:
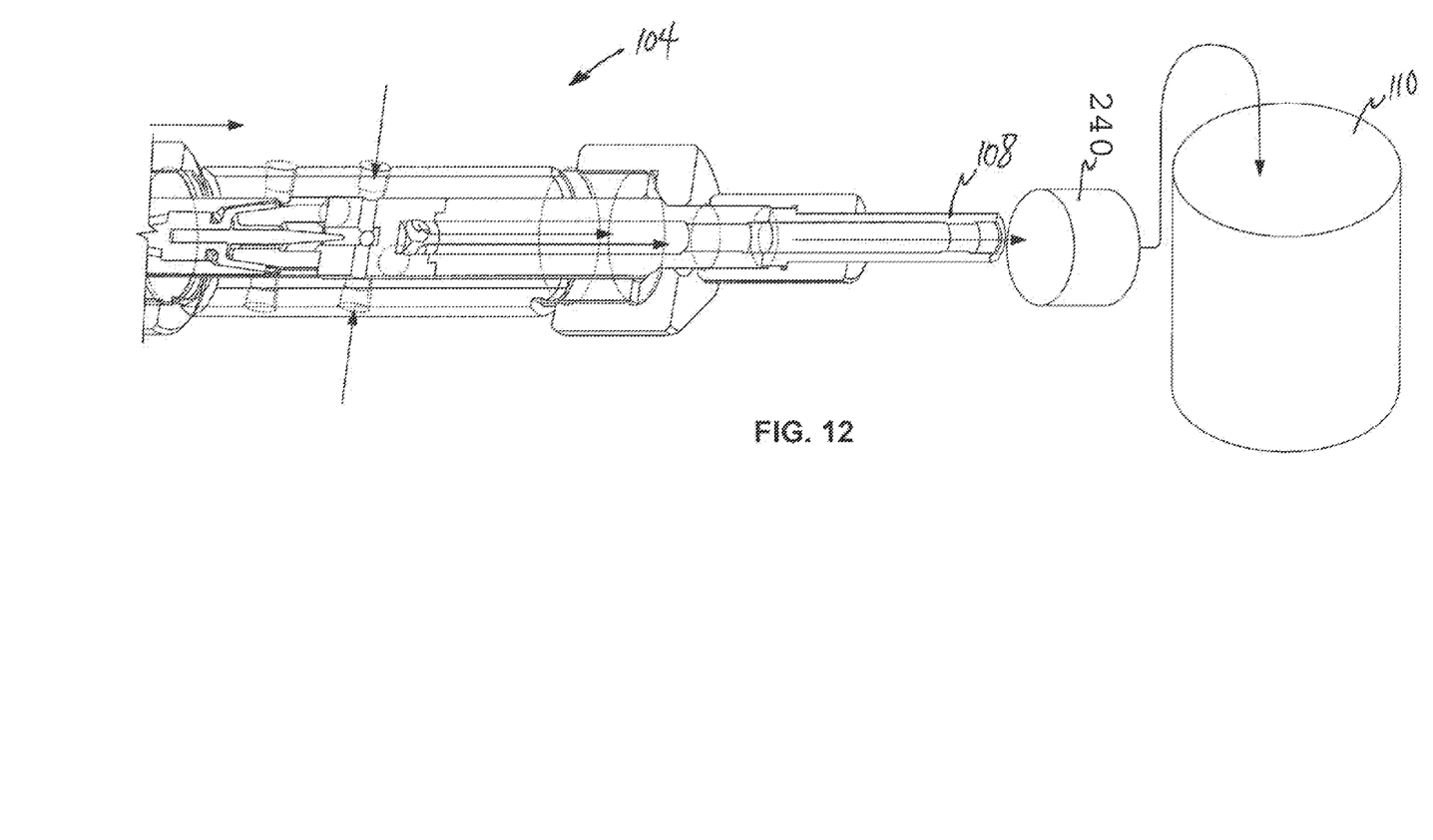
FIG. 12 is a system with a booster between the combustion chamber and the mixing device for injecting gaseous fluid composite mixture.
Figure 13:
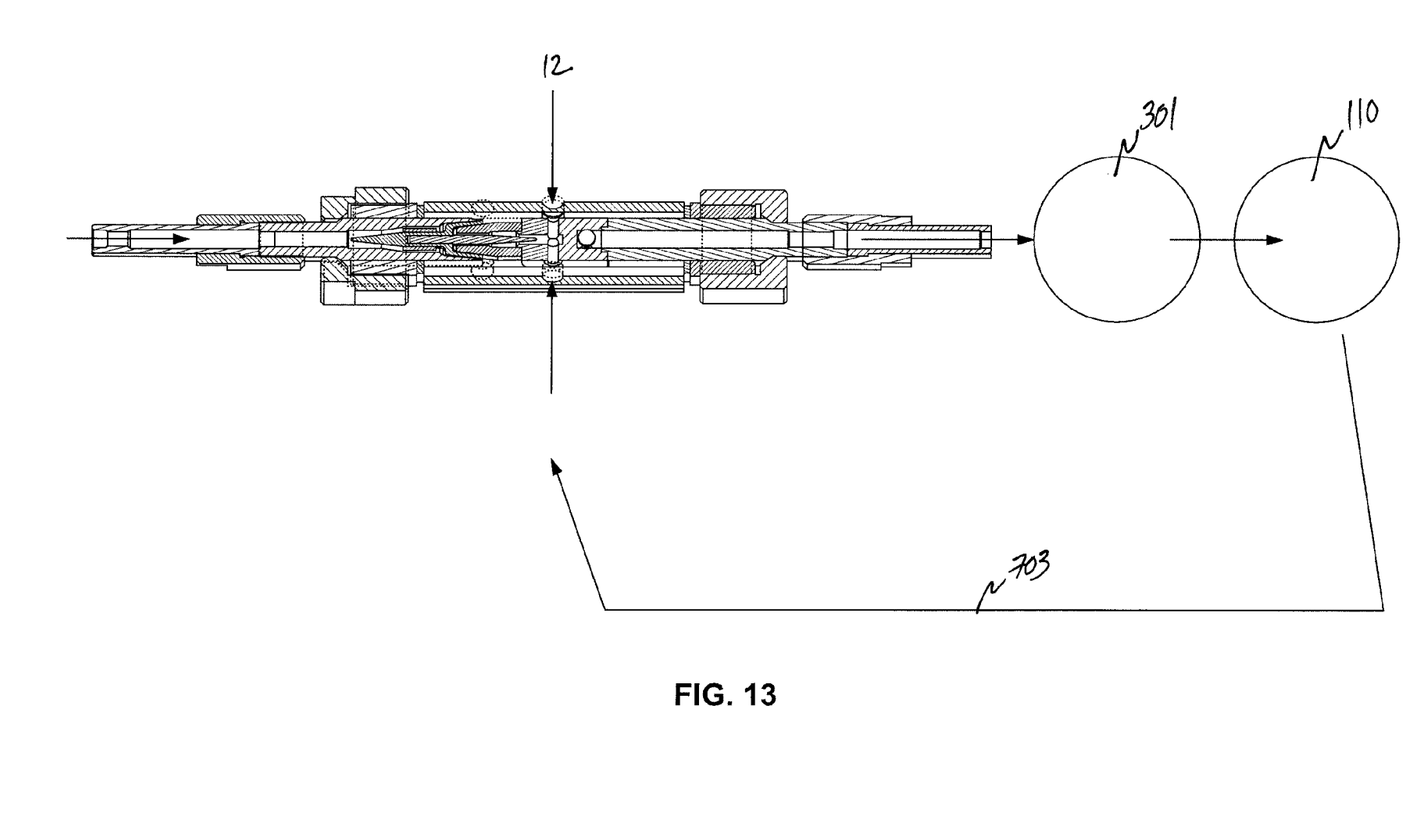
FIG. 13 is a system with a pump between the combustion chamber and the mixing device for injecting gaseous fluid composite mixture and wherein recirculation of exhaust is contemplated.

FIGS. 8-11 are alternate views of the device 104 as described above. Air travels along a passageway 701 until it reaches a zone where it can expand 702. FIG. 12 shows how the device 104 can use a nozzle 108 in conjunction with a high pressure pump 240 to cause a direct injection of the gaseous fuel composite from the device 104 into the chamber 110. At FIG. 13, a booster 301 who generally used fuel or air to operate can be made to accept gaseous fuel composite or a fuel mixture to further increase the pressure at the combustion chamber 110. In one embodiment, a pressure of 200 bar of the gaseous fuel mixture is contemplated within the combustion chamber 110. In yet another embodiment the gaseous fuel composite may be directly inserted into the combustion chamber 110 at a nominal pressure of 40 bars. As explained above and shown by 703 recirculation of exhaust is also contemplated along with air 12.

Figure 16:
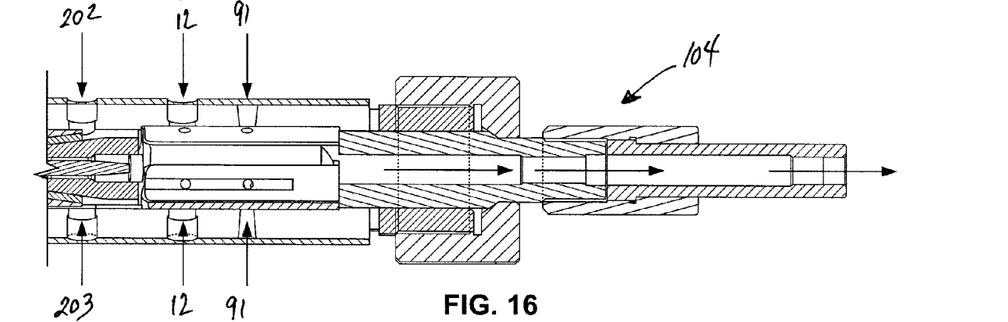
FIG. 16 is an oxygenated fuel composite with air, possibly recycled exhaust gas, and a cooling chamber for cooling of the gaseous fuel composite using a Livshits Ring according to different embodiments of the present disclosure.
Figure 17:
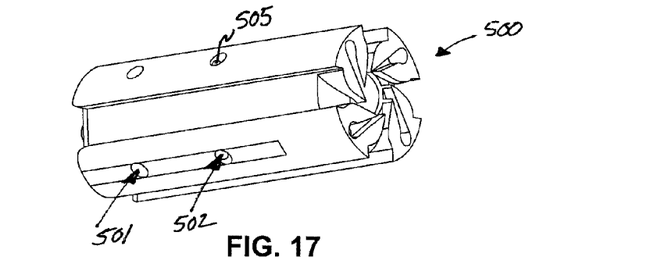
FIG. 17 is a Livshits Ring according to an embodiment of the present disclosure.
Figure 18:
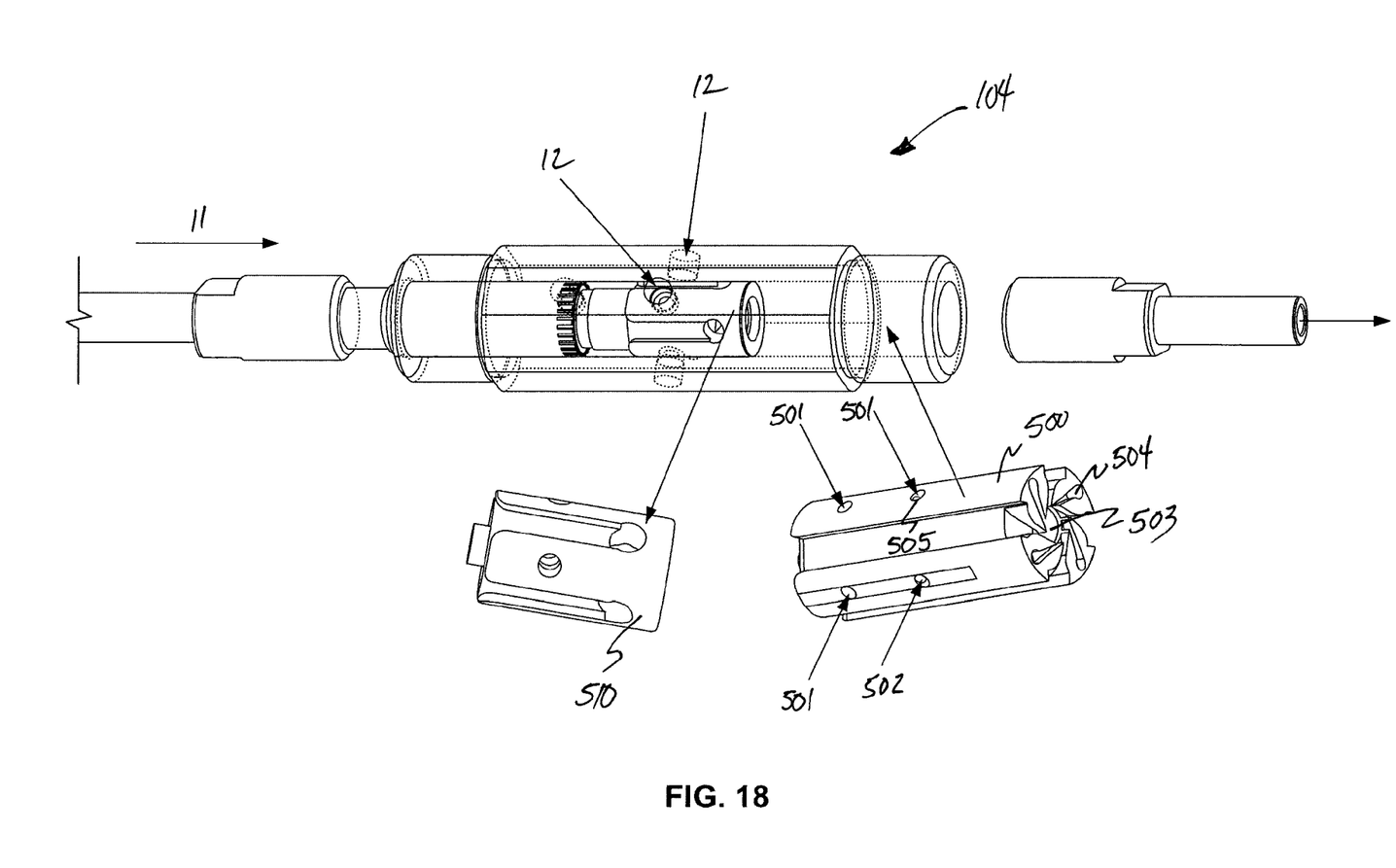
FIG. 18 in an exploded 3D view of a mixing device where a Livshits Ring may be added as an extra step of cooling according to another embodiment of the present disclosure.

FIG. 18 illustrates the configuration also shown partly at FIG. 16 where a Livshits Ring 500 may be used to offer additional cooling to incoming air 501 or incoming exhaust gas 502 from the cycle. The Livshits Ring 500 has holes 505 and allows for the gas to migrate along openings 504 aligned perpendicularly with the device 104 as shown at FIG. 16 and exit and expand adiabatically in an internal chamber 503 creating a cooling vortex. What is shown at FIG. 18 is how the Livshits Ring 500 can in interchangeably placed into the device 104 to replace another adiabatic expander 510 or a splitter. Livshits Rings are well described in International Application No. PCT/US2009/043547, filed on May 12, 2009, entitled System and Apparatus for Condensation of Liquid from Gas and Method of Collection of Liquid.

In one embodiment, shown at FIG. 14, the mixing device 104 includes an air inlet 12 for mixing air into the fuel 11 from the supply of the fuel for producing the gaseous fuel mixture made of at least the fuel and the air. The mixing device 104, shown at FIG. 16, may also includes a fluid inlet 202, 203, for mixing a secondary fluid into the fuel for producing the gaseous fuel mixture made of at least the fuel and the secondary fluid. At FIG. 16, the mixing device 104 includes a fluid inlet 202, 203, for mixing a secondary fluid into the fuel 11 for producing the gaseous fuel mixture made of at least the fuel 11, the air 12, and the secondary fluid 202, 203.

In another embodiment, a system for reducing soot and unwanted emissions of a diesel engine 1 as shown at FIG. 1 implemented in an engine having a cylinder 109 with a combustion chamber 110 in communication with a nozzle 108, an input valve 113, a release valve 112, a nozzle 108 includes a system for the supply of a fuel to the nozzle such as a tank 101 with a pump 102, a mixing device 104 for a transformation of the fuel into a gaseous fuel mixture, a system for the supply of an reactant in the combustion chamber via the input valve 114, 115, a system for the combustion of the gaseous fuel mixture in the combustion chamber via the cylinder 109, and a system for the evacuation of exhaust gas 112, 111 via the release valve 112.

It is understood that the preceding detailed description of some examples and embodiments of the present invention may allow numerous changes to the disclosed embodiments in accordance with the disclosure made herein without departing from the spirit or scope of the invention. The preceding description, therefore, is not meant to limit the scope of the invention but to provide sufficient disclosure to one of ordinary skill in the art to practice the invention without undue burden.

What is claimed is:

1. An internal combustion engine, comprising:
 a supply of a fuel with a pump;
 a cylinder with a combustion chamber in communication with a nozzle;
 an input valve in the combustion chamber for entry of air;
 a release valve for the release of exhaust gasses formed in the combustion chamber;
 a mixing device, with lateral openings, having air and fuel traveling in opposite longitudinal directions of the mixing device to merge after the air travels inside of a conical reflector and the fuel travels outside the conical reflector on opposite sides of the conical reflector to form a gaseous fuel mixture;
 the mixing device being connected to the pump and the nozzle for the gaseous fuel mixture to be released through the nozzle into the combustion chamber; and
 wherein the gaseous fuel mixture is further mixed with air in the combustion chamber.

2. The internal combustion engine of claim 1, wherein the mixing device includes an air inlet for mixing air into the fuel from the supply of the fuel for producing the gaseous fuel mixture made of at least the fuel and the air.

3. The internal combustion engine of claim 2, wherein the mixing device includes a fluid inlet for mixing a secondary fluid into the fuel for producing the gaseous fuel mixture made of at least the fuel, the air, and the secondary fluid.

4. The internal combustion engine of claim 3, wherein the secondary fluid is selected from a group consisting of water, and ethanol.

5. The internal combustion engine of claim 3, wherein the secondary fluid is exhaust gas.

6. The internal combustion engine of claim 1, wherein the mixing device includes a fluid inlet for mixing a secondary fluid into the fuel for producing the gaseous fuel mixture made of at least the fuel and the secondary fluid.

7. The internal combustion engine of claim 1, wherein the mixing device includes a Livshits Ring for cooling of the gaseous fuel mixture.

8. The internal combustion engine of claim 1, further comprising a high pressure pump for pressurizing the gaseous fuel mixture.

9. The internal combustion engine of claim 1, further comprising a booster with an outlet connected to the combustion chamber and an inlet connected to the mixing device and using the gaseous fuel mixture from the mixing device.

10. An internal combustion engine, comprising:
a supply of a fuel with a pump; a cylinder with a combustion chamber in communication with a nozzle;
an input valve in the combustion chamber for entry of air;
a release valve for the release of exhaust gasses formed in the combustion chamber;
a mixing device, with lateral openings having air and fuel traveling in opposite longitudinal directions of the mixing device to merge after the air travels inside of a conical reflector and the fuel travels outside of the conical reflector on opposite sides of the conical reflector to form a gaseous fuel mixture;
the mixing device being connected to the pump and the nozzle for producing the gaseous fuel mixture to be released through the nozzle into the combustion chamber;
wherein the mixing device includes an air inlet for mixing air into the fuel from the supply of the fuel for producing the gaseous fuel mixture made of at least the fuel and the air; and
wherein the air is compressed air for producing the gaseous fuel mixture made of at least the fuel and compressed air.

11. The internal combustion engine of claim 10, wherein the gaseous fuel mixture is released expanded at the nozzle for cooling the pressurized gaseous fuel mixture into the combustion chamber.

12. A system for reducing soot and unwanted emissions of a diesel engine, the system implemented in an engine having a cylinder with a combustion chamber in communication with a nozzle, an input valve, and a release valve, the system comprising:
a system for the supply of a fuel to the nozzle, the system comprising a mixing device, with lateral openings with air and fuel traveling in opposite longitudinal directions of the mixing device to merge after the air travels inside of a conical reflector and the fuel travels outside of the conical reflector on opposite sides of the conical reflector for a transformation of the fuel and the air into a gaseous fuel mixture;
a system for the supply of a reactant in the combustion chamber via the input valve;
a system for the combustion of the gaseous fuel mixture and the reactant in the combustion chamber via the cylinder; and
a system for the evacuation of exhaust gas via the release valve.

13. The system for reducing soot of claim 12, wherein the mixing device includes an air inlet for mixing air into the fuel from the system for the supply of the fuel for producing the gaseous fuel mixture made of at least the fuel and the air.

14. The system for reducing soot of claim 13, wherein the mixing device includes a Livshits Ring for cooling of the gaseous fuel mixture before the combustion chamber.

15. The system for reducing soot of claim 13, wherein the system for the supply of fuel further comprises a high pressure pump.

16. The system for reducing soot of claim 13, wherein the system for the supply of fuel further comprises a booster.

17. The system for reducing soot of claim 12, wherein the mixing device includes a fluid inlet for mixing a secondary fluid into the system for the supply of the fuel for producing the gaseous fuel mixture made of at least the fuel and the secondary fluid.

18. The system for reducing soot of claim 17, wherein the secondary fluid is selected from a group consisting of water, ethanol, and methanol.

19. The system for reducing soot of claim 17, wherein the secondary fluid is exhaust gas.

20. The system for reducing soot of claim 12, wherein the mixing device includes a fluid inlet for mixing a secondary fluid into the system for the supply of the fuel for producing the gaseous fuel mixture made of at least the fuel, the air, and the secondary fluid.

21. A system for reducing soot and unwanted emissions of a diesel engine, the system implemented in an engine having a cylinder with a combustion chamber in communication with a nozzle, an input valve, and a release valve, the system comprising:
a system for the supply of a fuel to the nozzle, the system comprising a mixing device, with lateral openings with air and fuel traveling in opposite longitudinal directions of the mixing device to merge after the air travels inside of a conical reflector and the fuel travels outside of the conical reflector on opposite sides of the conical reflector for a transformation of the fuel and the air into a gaseous fuel mixture;
a system for the supply of a reactant in the combustion chamber via the input valve;
a system for the combustion of the gaseous fuel mixture and the reactant in the combustion chamber via the cylinder; and
a system for the evacuation of exhaust gas via the release valve wherein the mixing device includes an air inlet for mixing air into the fuel from the system for the supply of the fuel for producing the gaseous fuel mixture made of at least the fuel and the air, and wherein air is compressed air for producing a pressurized gaseous fuel mixture.

22. The system for reducing soot of claim 21, wherein the gaseous fuel mixture is released expanded at the nozzle for cooling the pressurized gaseous fuel mixture into the combustion chamber.

* * * * *